United States Patent Office 2,774,734
Patented Dec. 18, 1956

2,774,734

FLUID FOR GRAVITY SEPARATION

Franz Rodis and Friedrich Thomas, Knapsack, Kreis Koln, Germany, assignors to Knapsack-Griesheim Aktiengesellschaft für Stickstoffdünger und Autogentechnik, Knapsack, Bezvik Koln, Germany, a manufacturing and trading organization under the laws of the Allied Control Council and Allied High Commission of Germany No Drawing. Application September 23, 1952, Serial No. 311,148

Claims priority, application Germany October 2, 1951

5 Claims. (Cl. 252—60)

If it is intended to separate mixtures the individual constituents of which have various specific gravities, fluids for gravity separation are used which are prepared by the addition of finely divided solid gravity substances to water or saline solutions. The specific gravity of these fluids can be increased by using solid materials of a high specific gravity. As materials of this kind there are, for example, known: amidosulfonate of lead, fluor spar (fluorite) and hematite, iron oxide, heavy spar (barite), ferrosilicon, pyrolusite (manganese dioxide), roasted pyrites, floating agents capable of being magnetically affected, hammer scale, sea sand, clay, loam, aluminum silicate and others.

The materials to be separated, for example ores and gangue, are separated in the afore-named fluid for gravity separation, and in this case the part of a lower specific gravity floats on top, whereas the heavier part sinks down to the bottom of the fluid. According to the kind and quantity of the finely divided gravity substance used, the specific gravity of the separating fluid may be adjusted to various levels. The highest specific gravities are attained with pulverized galena and pulverized ferrosilicon. If the silicon content of the latter is not beyond an exactly defined limit and if the ferrosilicon powder is still magnetic, it has, furthermore, the advantage that it can be readily recovered from the flowing-off water, whereas, if galena is used, a flotation has to be carried out.

When the gravity separation process is carried out in practice, the fluid for this separation is enriched with the most finely divided particles in an undesirable manner and the viscosity of the fluid gradually becomes so high that a floating or sinking of the ores can no longer take place. These most finely divided particles originate from the dressed ores and also from the gravity substance itself which, owing to the vigorous movement of the fluid, undergoes heavy abrasion. If ferrosilicon is used as the gravity substance, very little exceedingly fine dust is thus formed owing to the hardness of the material, but, nevertheless, it is noticeable in an undesired manner.

The ferrosilicon powder employed as gravity substance has, hitherto, been obtained in the usual way from large pieces by a coarse crushing and a subsequent fine crushing, for example in ball mills. The particles must have a diameter not larger than $200\mu$. On an examination with the microscope it is to be seen that these particles have sharp edges and points. Just at these parts the abrasion is, of course, the strongest. If corrosive material is used which acts on the pH-value of the fluid, and even already when using water, corrosion begins first at these sharp parts, this being extremely detrimental for the entire process. Such corrosion can probably be explained by the fact that, as is known, on surfaces of fractures residual valences and residual affinities are formed at the edges The present invention relates to a new fluid composition of matter for gravity separation of ores and to a new process of concentrating ores by means of said fluid composition.

Now, we have found that solid, finely subdivided, heavy particles, such as for example ferrosilicon powder, do not show the afore-named drawbacks, if they have a smooth surface and have a round, or oval elongated form.

When the fluid compositions of matter for gravity separation of ores according to the present invention are used containing particles of a round shape, abrasion of these particles is essentially less than in the case of particles having sharp edges and points. It is not absolutely necessary that the particles must be present in the form of balls; they may also be used in a globular, elongated, drop-shaped form. When said particles are prepared according to certain methods, most of them are obtained in a globular form of varying shape. The mathematical boundary by a spherical surface is, however, not the essential characteristic feature of the present invention. Rather, said feature consists in using particles which are distinguished by a particularly smooth surface, contrary to a surface showing sharp edges and points as it is produced, for example on grinding ferrosilicon in lumps. The smooth surface may, for instance, be produced as follows: the liquid raw material is torn apart to form fine particles and is suddenly quenched. The individual particles tend to form a surface, as small as possible, a round shape and a smooth surface being thus formed.

Contrary to powders obtained by grinding, powders of the afore-described kind have the advantage, that they are resistant to corrosion especially when using them as materials for gravity separation of ores. No reaction takes place with the water used for the preparation of the fluids, or with the oxygen dissolved therein. The resistance to corrosion of the material may, in some cases, also be due to its chemical composition, the nature of the surface is, however, the essential feature. Hence results, that in intimate contact with water even the finest portions of the sprayed ferrosilicon powder do not develop hydrogen. If the same powder is additionally crushed in an agate dish, without coming into contact with another metal, a noticeable evolution of hydrogen sets in already after only one day's contact with water. Such a crushed powder whose surface is, of course, no longer smooth, shows formation of rust when it is frequently wetted with water and allowed to stand for some time. During the industrial use, said rust, which can readily be removed by rubbing, causes a loss of gravity material, for example of ferrosilicon which amounts to about 16 percent of the total loss of ferrosilicon, according to the statements found in one case in the pertinent literature.

A further advantage consists in the following: Owing to the absence of any corrosion, the addition of lime is no longer necessary. Heretofore an addition of 10 percent (calculated upon the powdered gravity substance) used to be made to the aqueous suspension for increasing the pH value and thus preventing corrosion. All the drawbacks involved by the use of lime have thus been overcome.

Moreover, the adhesion losses are smaller than with edged material. These losses are caused as follows: In spite of an intensive rinsing off, a certain portion of the gravity substance adheres to the ore to be dressed. If the gravity substance has a smooth surface, according to the present invention, the adherence is smaller than with a material having a rough surface. Investigations have shown that, when using a round and smooth material for gravity separation of ores according to the present invention, in particular ferrosilicon, for carrying out the gravity separation these losses are 60 percent lower with, for example siderite; 49 percent lower with quartz having a relatively rough surface, 21 percent lower with the usual gravelstone (pebbles) and 23 percent lower with chamotte fractions having a rough surface, always compared with ground ferrosilicon powder of the hitherto used kind.

Moreover, the viscosity of the fluid to be used for gravity separation of ores containing the material according to the present invention is somewhat less than with ground material. The specific gravity of the fluid may be increased to 3.7 and the fluid does not become unduly viscous. 45 percent by volume of solid material is then contained in the suspension, a value which could not yet be attained with other solid substances. Owing to the high specific gravity, it is possible to dress ores which hitherto could not be separated with ferrosilicon as a gravity material.

The surface of these round particles of ferrosilicon looks like it were polished when examining it with the microscope. One should assume that owing to their round shape and smooth surface the particles would rapidly sink down in the fluid. Investigations have, however, proved, and this being surprising, that within the range of granulation below about $200\mu$ the velocity of settling of these round particles is substantially equal to that of edged ferrosilicon grains, as they are obtained by grinding. Only with granulations above about $200\mu$ a more rapid sinking down of the round grains can be noticed. It is advantageous to keep the portion of small particles having a diameter of less than about 20 to $30\mu$ as small as possible. If the portion of these small particles is not above about 10 percent, it is not detrimental. It had to be feared that round grains would have hollow spaces in the interior as they were noticed in very finely divided melts. When determining the apparent and real specific gravities there can be recognized that these hollow spaces are practically not present. It has been observed that they are only present in grains whose size is above $200\mu$.

These examples show the advantages of the present invention over the hitherto known processes which operate with compositions of matter having a rough surface.

On using the hitherto usual ground, edged powder for gravity separation, the individual particles undergo, it is true, a certain grinding off (polishing); however, such round and smooth surfaces as are present with the material used according to the present invention are never attained. By the grinding off of the edged particles exceedingly fine dust is formed which, as is known, is detrimental because the viscosity of the fluids is increased thereby and an undesirable, fine solid material is thus added to the fluids to be used for gravity separation of ores. These drawbacks are likewise avoided if the smooth bodies according to the present invention are applied.

Finally, the preparation of round particles is considerably more economical compared with the high costs necessary e. g. for crushing the hard and tough ferrosilicon to obtain an edged powder.

Instead of ferrosilicon it is possible to use ferrosilicon alloys, for example alloys having a content of anticorrosive additional substances, such as copper, aluminum or other materials.

Ferrosilicon produced in an electric melting furnace has, in this respect, been found of advantage. Probably owing to the strongly reducing action of the electric furnace and its high operating temperature, a ferrosilicon thus produced is less liable to corrosion and, therefore, does not require any anti-corrosive additional substances. Moreover, ferrosilicon may be used which is obtained as an undesirable by-product during the manufacture of calcium carbide and which is separately tapped from the calcium carbide furnace. It is, however, also possible to tap the ferrosilicon together with the calcium carbide, and to obtain it during the gasification of the calcium carbide with water.

It may be advisable that the content of silicon in the ferrosilicon amounts to not less than about 11 percent. If the content of silicon is smaller than about 11 percent, the risk of corrosion increases. If, after the dressing, it is intended to recover the ferrosilicon by means of the magnetic separation-process, it is advisable to use a ferrosilicon having a content of not more than about 22 percent of silicon, since with a higher silicon content the material is no longer sufficiently magnetic. Ferrosilicon containing about 11 to about 22 percent of silicon has a particularly high toughness and a low brittleness; it can, therefore, be ground only with difficulty. For this reason the use of a ferrosilicon having a round, smooth surface and being obtainable from the melt is especially advantageous. The costs for the preparation from the melt are essentially lower than the costs of grinding.

The present invention is not limited to ferrosilicon. Other solid substances, which can be shaped according to known methods to form compact, hard, heavy spherical particles may also be used. They, too, have the advantage that they are less subject to abrasion and hardly undergo any corrosion so that practically no loss arises. Materials of said kind are, for example: Especially fluor spar and metal alloys, furthermore hematite, iron oxide, heavy spar, roasted pyrites, hammer scale, sea sand and aluminum silicate. All these materials may be transformed, for example by spraying in the molten state, into round, smooth particles; a decomposition does not take place. If it is required owing to the specific gravity of the ore to be dressed or if certain tailings have to be separated, any usual alloy may be used, such as, for example, refined steel of the type of the stainless steel, bronze, brass, and others.

The smooth, round particles to be used as gravity substances in fluids for gravity separation of ores may be separated and recovered by means of generally known processes. The recovery by means of magnetism, as it is described in U. S. Patent No. 2,206,980 is particularly advantageous. For this process there must be used particles of materials which are magnetic.

The process of the present invention allows of dressing for example the following ores: Iron-ores, lead ores, zinc ores and copper ores, furthermore all the minerals whose specific gravity and that of their tailings are suitable, i. e. the specific gravity of the minerals and of the tailings thereof must be sufficiently far apart, so that the minerals sink down in the liquid, whereas the tailings float; this is true of most of the important minerals if the density of the fluid has been adjusted to 1.5–3.7. On dressing coal whose specific gravity is relatively low, the procedure is, for example vice versa, the light coal floats on top of the fluid and the impurities of a heavy specific gravity sink down.

The importance of the present invention resides in the fact that the ferrosilicon powder can now be produced on a more economical scale than was hitherto possible and that the advantages of the ground material hitherto used have been further increased.

We claim:
1. A composition of matter useful for gravity separation of gangue from comminuted mineral matter, said composition comprising water and rapidly cooled atomized particles of ferro-ally of up to 200 micron in diameter.
2. A composition of matter useful for gravity separation of gangue from comminuted mineral matter, said composition comprising water and rapidly cooled atomized particles of ferrosilicon of up to 200 micron in diameter.
3. A composition of matter useful for gravity separation of gangue from comminuted mineral matter, said composition comprising water and rapidly cooled atomized particles of ferrosilicon containing between 11% and 22% by weight silicon and of a diameter up to 200 micron.
4. A composition of matter useful for gravity separation of gangue from comminuted mineral matter, said composition comprising water and rapidly cooled atomized particles of ferrosilicon containing between 11% and 22% by weight silicon and of a diameter up to 200 micron with not more than 10% of the particles of a diameter less than 20 to 30 micron.

5. A composition of matter useful for gravity separation of gangue from comminuted mineral matter, said composition comprising water and containing rapidly cooled atomized particles of electro-furnace produced ferrosilicon of up to 200 micron in diameter.

References Cited in the file of this patent

UNITED STATES PATENTS

| | | |
|---|---|---|
| 1,559,938 | Chance | Nov. 3, 1925 |
| 2,336,470 | Davis | Dec. 14, 1943 |

FOREIGN PATENTS

| | | |
|---|---|---|
| 523,459 | Great Britain | July 15, 1940 |
| 647,021 | Great Britain | Dec. 6, 1950 |

OTHER REFERENCES

U. S. Bureau of Mines Report of Investigation No. 3469; September 1939.